United States Patent
Cai et al.

(10) Patent No.: US 7,752,670 B2
(45) Date of Patent: Jul. 6, 2010

(54) DETECTING AN ATTACK OF A NETWORK CONNECTION

(76) Inventors: Xiangrong Cai, 5 Kenmar Dr., Apt. 19, Billerica, MA (US) 01821; Sasi Harpanahalli, 143 Sherburne Ave., Tyngsboro, MA (US) 01879; Deepak Seth, 1600 Massachusetts Ave., Apt. 305, Cambridge, MA (US) 02138-2922

( * ) Notice: Subject to any disclaimer, the term of this patent is extended or adjusted under 35 U.S.C. 154(b) by 1649 days.

(21) Appl. No.: 10/948,582

(22) Filed: Sep. 23, 2004

(65) Prior Publication Data

US 2006/0072455 A1 Apr. 6, 2006

(51) Int. Cl.
*H04L 29/06* (2006.01)

(52) U.S. Cl. .............. 726/25; 713/153; 713/187; 726/2; 726/11; 709/223

(58) Field of Classification Search ......... 713/153–154, 713/187–188; 726/2–3, 11–15, 22–25; 370/229, 370/235; 709/223–225
See application file for complete search history.

(56) References Cited

U.S. PATENT DOCUMENTS

| 6,757,248 B1* | 6/2004 | Li et al. | 370/235 |
| 7,203,961 B1* | 4/2007 | Dalal et al. | 726/22 |
| 2003/0191844 A1* | 10/2003 | Meyer et al. | 709/227 |
| 2003/0226035 A1* | 12/2003 | Robert et al. | 713/201 |
| 2004/0054796 A1* | 3/2004 | Kikuchi et al. | 709/229 |
| 2005/0039104 A1* | 2/2005 | Shah et al. | 714/776 |
| 2005/0132214 A1* | 6/2005 | Naftali | 713/200 |
| 2005/0160478 A1* | 7/2005 | Ramaiah et al. | 726/14 |
| 2005/0259660 A1* | 11/2005 | Gassoway | 370/394 |

OTHER PUBLICATIONS

Provisional application 60/572683.*
J. Postel, Request for Comments 793, "Transmission Control Protocol," Sep. 1981, pp. 1-85.
J. Postel, Request for Comments 791, "Internet Protocol," Sep. 1981, pp. 1-45.
S. Deering and R. Hinden, Request for Comments 2460, "Internet Protocol, Version 6 (IPv6)," Dec. 1998, pp. 1-39.
M. Dalal, Network Working Group, Internet Draft, "draft-ietf-tcpm-tcpsecure-01," Jun. 2, 2004, pp. 1-17.

* cited by examiner

*Primary Examiner*—Kimyen Vu
*Assistant Examiner*—Darren Schwartz
(74) *Attorney, Agent, or Firm*—Trop Pruner & Hu, P.C.

(57) ABSTRACT

To detect an attack of a network connection, detection of a message containing a sequence number that is within a valid sequence number range is performed, where the message is intended to cause reset of the network connection. The message is dropped, and a counter is incremented to track a number of occurrences of receiving the message in response to detecting that the sequence number in the message is within the valid sequence number range.

20 Claims, 2 Drawing Sheets

DETECTING AN ATTACK OF A NETWORK CONNECTION

TECHNICAL FIELD

This invention relates to detecting an attack of a network connection.

BACKGROUND

Advances in communications technology have enabled for a greater variety of and more convenient communications over data networks. Traditional types of communications over data networks include web browsing, electronic mail, file transfers, and so forth. With the greater bandwidth available on data networks, real-time communications over data networks have also become increasingly popular, including electronic gaming, voice over packet data, streaming communications, and others.

A data network typically includes many components, including network terminals (referred to as clients), servers, routers, firewalls, and other network elements. The data network can include a public network (such as the Internet) and/or private networks (such as local area networks or wide area networks).

A network protocol that defines packet-based communications over data networks includes the Internet Protocol (IP). IP provides a network layer that communicates IP packets over a data network. Above the network layer is a transport layer to define interconnections between hosts. One example of a transport layer is a Transmission Control Protocol (TCP) layer. TCP is a connection-oriented, end-to-end protocol that provides for reliable inter-process communication between pairs of processes in host computers attached to communication networks.

To enable reliable network connections, TCP follows the following general principle of robustness: "Be conservative in what you do, be liberal in what you accept from others." TCP segments (a "segment" is basically a message) contain sequence numbers that define the proper sequence of the segments. At the receiving network device, a TCP segment received over a TCP connection is accepted if the sequence number falls within a window of sequence numbers, and for data segments, if an acknowledge number falls within a window of acknowledge numbers.

The acceptable window of sequence numbers is a sliding window that changes as the sequence number increments. For a TCP connection, each of the two endpoints (network devices) maintain the next sequence number to be used and the next acknowledge number to be received, along with source IP address, source TCP port, destination IP address, destination TCP port, and TCP connection state information. In response to sending data, the sending network device will receive acknowledgments (in subsequent TCP segments from the receiving device). The sending network device keeps track of a variable SND.UNA, which is the oldest unacknowledged sequence number. An unacknowledged TCP segment is stored in a retransmission queue (for retransmission in case an acknowledgment from the receiving network device is not received). A TCP segment is fully acknowledged if the sum of its sequence number and length is less than or equal to the acknowledgment value in the incoming segment.

The window size for an acceptable sequence number can be as great as $2^{16}$ (65,536). According to TCP, the maximum range of a sequence number is a number selected between 0 and $2^{32}-1$(2,147,483,647). However, since a TCP segment with a sequence number that falls within a window of up to size $2^{16}$ is accepted, that means that a hacker can send out $2^{16}$ (65,536) segments, with each segment having a sequence number that is $2^{16}$ larger than the previous segment, to hack into a network connection. One of the $2^{16}$ segments will fall into a current sliding window of the TCP connection. If the TCP segment received from the hacker is either a reset segment (RST) or a synchronize (SYN) segment, then the TCP network connection would be reset. With modern high-speed communications technology, sending $2^{16}$ (65,536) segments can be accomplished in a matter of seconds or minutes. Therefore, a hacker can easily hack into a TCP connection to cause the connection to be reset. If the sequence number window size (RCV.WND) is less than $2^{16}$, then the likelihood of successfully attacking a TCP connection with an RST or SYN segment is $2^{32}$/RCV.WND.

Another type of hacking is blind data injection. According to TCP, both the sequence number (SEG.SEQ) of a transmitted TCP data segment and an acknowledge number (SEG.ACK) of the data segment should be within respective valid windows of sequence and acknowledge numbers for the TCP segment to be taken as valid. As noted, the window (RCV.WND) of acceptable sequence numbers can be as large as $2^{16}$. However, the acknowledge number (SEG.ACK) of a received TCP segment is acceptable if (SND.UNA-($2^{32}$-1)) $\leq$SEG.ACK$\leq$SND.NXT, where SND.NXT is the next sequence number to be sent by the network device. The net effect is that a hacker only has to guess two acknowledge numbers with every guessed sequence number so that the probability of successfully injection a TCP data segment into a TCP connection is one in 2*($2^{32}$/RCV.WND).

Although proposals have been made for techniques to prevent the types of attacks discussed above, mechanisms conventionally have not been provided for detecting such attacks.

SUMMARY

In general, methods and apparatus are provided to detect attacks of a network connection. For example, a method of detecting an attack of a network connection includes receiving a message containing a sequence number that is within a valid sequence number range, the message intended to cause reset of the network connection. The method further includes dropping the message even though the sequence number is within the valid sequence number range, and, in response to detecting that the sequence number in the message is within the valid sequence number range, incrementing a counter to track a number of occurrences of receiving the message.

Other or alternative features will become apparent from the following description, from the drawings, and from the claims.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

Figure 1:
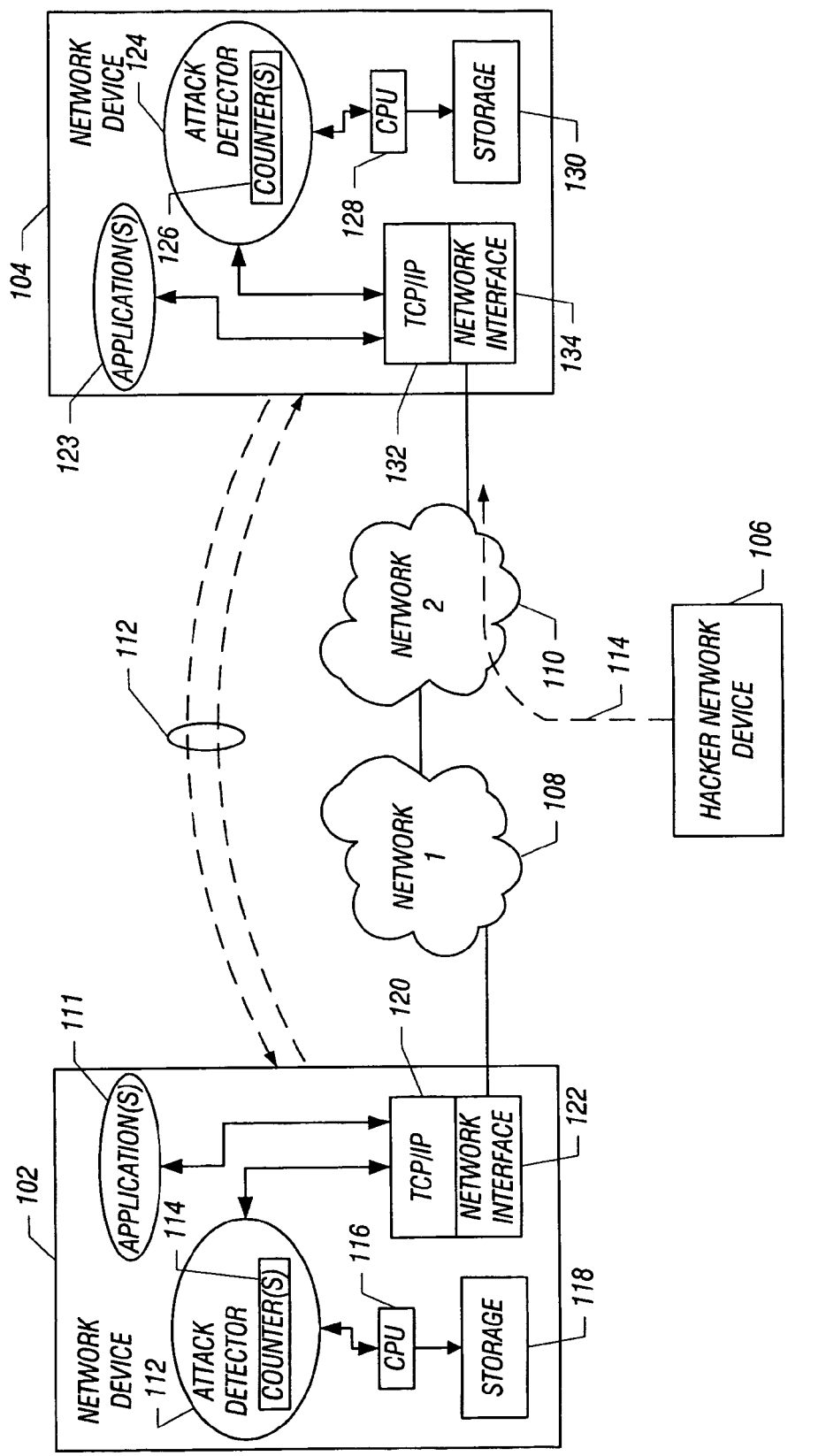
FIG. 1 is a block diagram of a network that incorporates an embodiment of the invention.

FIG. 1 illustrates an example network that includes network devices 102 and 104 coupled through network 108 (designated "network 1") and network 110 (designated "network 2"). Although two networks 108 and 110 are depicted, it is noted that a different implementation can employ either one network or additional networks. Examples of networks include local area networks (LANs), wide area networks (WANs), the Internet, and so forth. Examples of the network devices 102 and 104 include desktop computers, notebook computers, servers, personal digital assistants (PDAs), tablet computers, Internet appliances, and so forth. The link between the network device 102 and network 108 can be a wired link or a wireless link. Similarly, the link between the network device 104 and network 110 can be wired link or a wireless link.

In accordance with some embodiments of the inventions, communications between the network devices 102 and 104 through networks 108 and 110 are accomplished through the use of Internet Protocol (IP) packets. One version of IP is IPv4, as described in RFC 791, entitled "Internet Protocol," dated September 1981. Another version of IP is IPv6, as described in RFC 2460, entitled "Internet Protocol, Version 6 (IPv6) Specification," dated December 1998. IP provides a network layer that defines packets for communicating data over a data network.

Also, the network devices 102 and 104 are able to establish Transmission Control Protocol (TCP) network connections over the IP-based networks 108 and 100. TCP is a connection-oriented, end-to-end protocol that provides for reliable inter-process communication between pairs of processes in network devices. TCP is described in RFC 793, entitled "Transmission Control Protocol," dated September 1981. As depicted in FIG. 1, a TCP network connection 112, which is a duplex connection, can be established between the network devices 102 and 104 over networks 108 and 110. A duplex connection refers to a connection in which data can be sent in both directions. A "network connection" established between network devices over one or more networks refers to a communications session or link established between the network devices. One type of network connection is a TCP connection. However, other types of network connections can be used in other implementations.

The information used for establishing a TCP connection includes the following: source IP address, source TCP port, destination IP address, destination TCP port, next sequence number, next acknowledge number, state of the TCP connection, and other information. The state of the TCP connection includes the following states: SYN-SENT state (which indicates that a network device is waiting for a matching connection request after having sent a connection request); SYN-RECEIVED state (which indicates that an entity is waiting for a confirming connection request acknowledgement after having both received and sent a connection request); ESTABLISHED state (which indicates an open connection exists where data can be received and delivered); and FIN-WAIT-1, FIN-WAIT-2, CLOSE-WAIT, CLOSING, AND LAST-ACK states (which represent various states associated with terminating a connection).

Note that the source and destination IP and TCP information kept in network device 102 is the opposite of the source and destination information kept in network device 104. In other words, the source IP address and TCP port stored in the network device 102 is the destination IP address and destination TCP port stored in network device 104. On the other hand, the source IP address and TCP port information stored in the network device 104 is the destination IP address and TCP port information stored in the network device 102.

To achieve a reliable connection, TCP provides for the assignment of a sequence number to each octet (or byte) transmitted in a TCP segment, and requires a positive acknowledgment from the receiving network device. Note that a segment can contain more than one octet of information. If the acknowledgment is not received within a timeout interval, the data is retransmitted. At the receiving network device, the sequence numbers are used to correctly order segments that may be received out of order and to eliminate duplicate segments. When a network device transmits a segment containing data, the network device puts a copy of the segment in a retransmission queue and starts a timer. When the acknowledgment for the data segment is received, the queued segment is deleted from the retransmission queue. However, if the acknowledgment is not received before the timer runs out, the segment is retransmitted.

In the TCP connection, each packet exchanged between the network devices 102 and 104 includes a TCP header. The TCP header includes the following pieces of information: source TCP port; destination TCP port; sequence number; acknowledge number; control bits; and other information. The control bits can specify that a segment is a control segment. For example, the control bits can specify that the segment is a reset (RST) segment for resetting a TCP connection. Also, the control bits can specify that the segment is a synchronize (SYN) segment for synchronizing a TCP connection. A TCP segment can also be a data segment for carrying bearer traffic.

Each network device 102, 104 maintains a parameter SND.NXT (which indicates the next sequence to be sent), and a parameter SND.UNA (which indicates the oldest unacknowledged sequence number). In addition, each network device 102, 104 maintains a parameter RCV.NXT (which represents the next sequence number expected in an incoming segment), and a parameter RCV.WND (which represents the size of the window of acceptable sequence numbers in an incoming packet). An incoming packet having a sequence number (SEG.SEQ) that has a value greater than or equal to RCV.NXT and less than or equal to RCV.NXT+RCV.WND−1 is considered a valid segment. Thus, for example, if the network device 102 sends a segment that contains a sequence number that falls within the expected window, then the destination network device 104 will accept the segment. Note that the size of the window can be as large as $2^{16}$ sequence numbers (i.e., RCV.WND=$2^{16}$).

Because a receiving network device is willing to accept a segment with a sequence number within some sliding window of sequence numbers, a hacker (such as a hacker using a hacker network device 106) can easily hack into the TCP connection 112 between the network devices 102 and 104. There are several types of attacks that the hacker network device 106 can perform. A first type of attack involves a blind reset of a TCP connection using an RST segment. A second type of attack involves a blind reset of a TCP connection using an SYN segment. Note that an RST segment is an explicit message for resetting the TCP connection. An SYN segment, although not explicitly a reset message, normally causes a network device to reset a connection. The SYN segment that is received in an ESTABLISHED state (a TCP state in which data transfer is occurring between the endpoints) means that something wrong has happened at the source network device, and thus the TCP connection should be reset. More generally, the RST and SYN segments are examples of messages intended to reset a network connection. In other implementations, other types of messages intended for resetting a network connection can be employed.

Since a conventional network device is willing to accept an RST or SYN segment with a sequence number that falls within a sliding window of size RCV.WND, then the likelihood that a TCP segment issued by the hacker network device 106 contains a valid sequence number is $2^{32}$/RCV.WND. Put another way, to successfully reset the TCP connection 112, the hacker network device 106 can issue $2^{32}$/RCV.WND segments, with the sequence number of each segment differing from the previous segment by RCV.WND. For a large RCV.WND value (e.g., $2^{16}$), the hacker can successfully perform a blind reset attack in a matter of seconds or minutes through a high-bandwidth network link.

A third type of attack involves blind data injection in which the attacker simply guesses two acknowledge numbers with each guessed sequence number so that the likelihood of the hacker successfully injecting data into a TCP connection is one in $(2*2^{32}$/RCV.WND). In other words, for each sequence number used in a TCP data segment (a segment carrying data), two acknowledge numbers are used. Thus, to successfully inject an unauthorized data segment into the TCP connection 112, all the hacker has to do is to inject $2*(2^{32}$/RCV.WND) TCP data segments. The ability to inject unauthorized data segments into a TCP connection causes various problems.

In accordance with some embodiments of the invention, an attack detector 112 is implemented in the network device 102, and an attack detector 124 is implemented in the network device 104, to detect an attack. The attack detector 112 or 124 also reduces the likelihood of or prevents a successful attack from the hacker network device 106 (or any other unauthorized network device). The network device 102 also includes a TCP/IP stack 120 and a network interface 122. Data of software application(s) 111 to be communicated over the networks 108 and 110 is passed through the TCP/IP stack 120 and the network interface 122. Similarly, the network device 104 includes a TCP/IP stack 132 and a network interface 134. Data of software application(s) 123 to be communicated over networks 108 and 110 is communicated through TCP/IP stack 132 and network interface 134.

Although the attack detector 112 or 124 is illustrated as being separate from the TCP/IP stack 120 or 132, respectively, it is noted that the attack detector 112 or 124 can actually be implemented as part of the TCP/IP stack 120 or 132, respectively. Alternatively, the attack detector 112 or 124 is a routine that is invoked by the TCP/IP stack 120 or 132 to perform attack prevention and detection. The software layers, including the application(s) 111 or 123, the attack detector 112 or 124, and the TCP/IP stack 120 or 132, are executable on a respective central processing unit (CPU) 116 or 128. Each CPU 116 or 128 is connected to a respective storage 118 or 130. In a different implementation, instead of being implemented as software, the attack detector 112 or 124 and/or the TCP/IP stack 120 or 132 can be implemented in hardware (or a combination of hardware and software).

As further depicted in FIG. 1, each attack detector 112 or 124 includes one or more counters 114 or 126, respectively. The counter(s) 114 or 126 are provided to enable tracking of segments (either RST segments, SYN segments, or data segments) that meet predetermined criteria. Such predetermined criteria define the types of segments that are likely to have been originated by a hacker, such as from hacker network device 106. The attack detector 112 or 124 uses the count value(s) stored in the counter(s) 114 or 126 to determine if an attack is under way against a particular TCP connection. Threshold(s) are defined and stored in the storage 118 or 130. The attack detector 112 or 124 compares the count value(s) of the counter(s) 114 or 126 against the threshold(s). If the count value(s) exceeds the defined threshold(s), then the attack detector 112 or 124 provides an indication that an attack is under way. This indication can be presented to a local user of the network device 102, 104. Alternatively, such an indication can be provided over a network (such as network 108 or 110) to a network device associated with a network administrator. In response to the indication of the attack, the network administrator or user of the network device 102, 104 can take remedial actions to stop the attack or to identify the source of the attack.

The process according to one embodiment is described in connection with FIG. 2. Upon receipt of a TCP segment (at 202), a receiving network device (102 or 104 in FIG. 1) determines (at 204) if a sequence number is within the current sliding window of sequence numbers. If not, the received TCP segment is dropped (at 206). Note that acts 202, 204, and 206 can be performed by the TCP/IP stack 120 or 132 (FIG. 1). However, if the received sequence number is within the sliding window, then the attack detector determines (at 208) the type of segment received. If the received segment is an RST segment, then the attack detector determines (at 210) if the sequence number (SEG.SEQ) of the received RST segment matches the expected sequence number (RCV.NXT) exactly. If so, then the TCP connection is reset (at 212). However, if the sequence number does not match the expected sequence number exactly, then the RST segment is dropped (at 214). Moreover, the attack detector sends (at 216) an acknowledgment segment to the sender. Next, the attack detector increments (at 218) an RST attack counter (one of counter(s) 114 or 126 in FIG. 1).

If the type of received segment is determined (at 208) to be a SYN segment, then the attack detector drops (at 220) the SYN segment. Next, the attack detector sends (at 222) an acknowledgment segment back to the sender. If the sequence number of the SYN segment matches exactly the expected segment sequence number, then the acknowledgment segment is sent with the SEG.ACK value being equal to the received acknowledgment number less the value 1. Upon the source network device receiving this acknowledgment segment, the source network device can either drop the acknowledgment segment (if the source network device is in the ESTABLISHED state) or reset the connection (if the source network device is in the initializing state and happens to choose the same source IP address, source TCP port, destination IP address, destination TCP port, and sequence number combination as an already existing TCP connection). This latter scenario may occur when one end of the TCP connection is being rebooted. Next, the SYN attack counter is incremented (at 224) by the attack detector. The SYN attack counter is one of the counter(s) 114 and 126 of FIG. 1.

If the type of the segment determined at 208 is a TCP data segment, then the attack detector determines (at 226) if the acknowledge number within the received data segment is within a "reduced" acknowledge number window. The reduced acknowledgment window is smaller than the window typically defined by TCP. For example, the reduced acknowledge number window can have a maximum size of 2*65,536 ($2^{17}$). However, another reduced acknowledge number window size can be used in another embodiment. If the acknowledge number of the received data segment is within the reduced acknowledge number window, then the data segment is accepted (at 228). However, if the acknowledge number of the received data segment is not within the reduced acknowledge number window, then the data segment is dropped (at 230). The data attack counter is then incremented (at 232). The data attack counter is one of the counter(s) 114 or 126 of FIG. 1.

Figure 2:
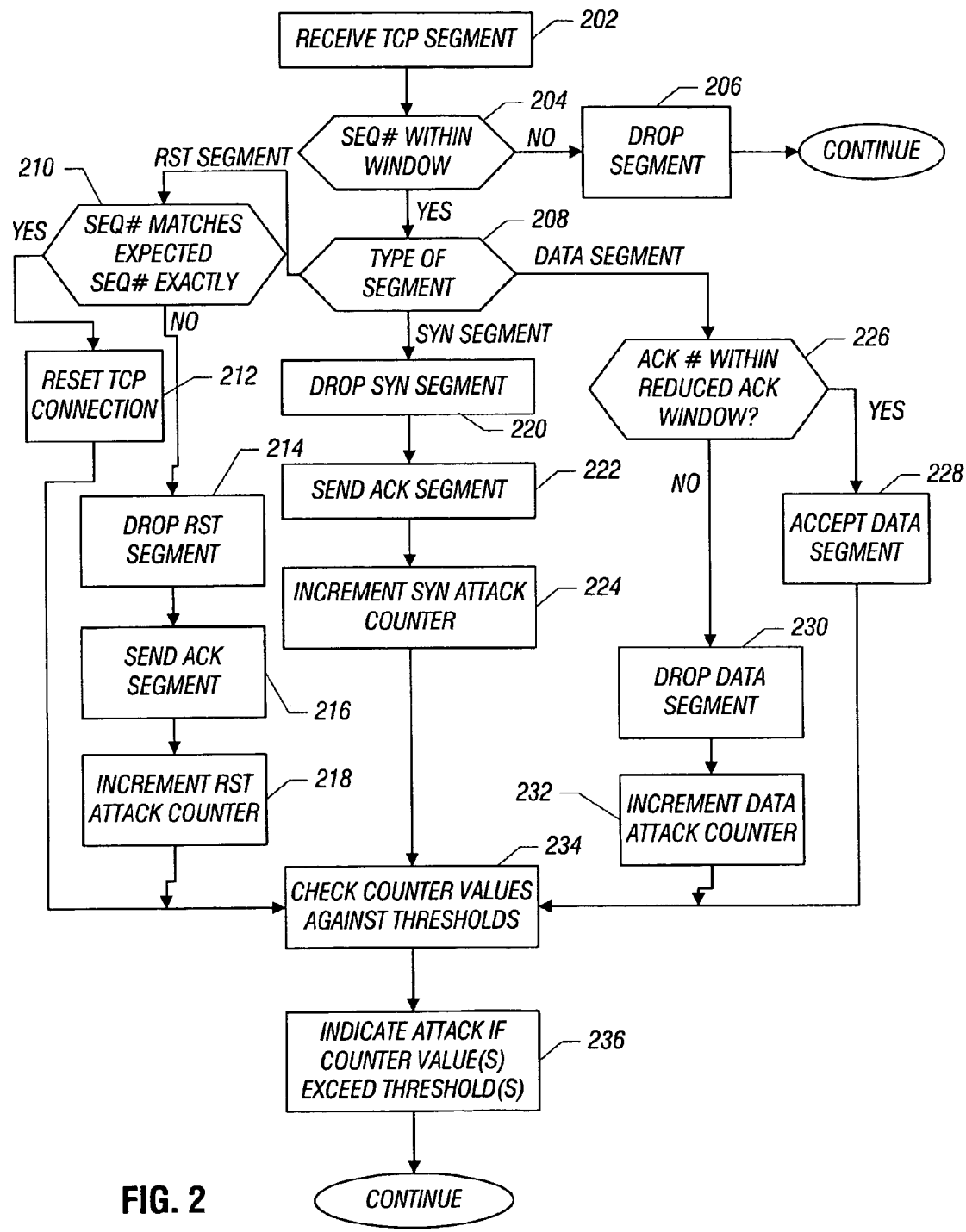
FIG. 2 is a flow diagram of a process of detecting an attack of a network connection, according to an embodiment of the invention.

Although indicated as being separate counters in FIG. 2, the RST attack counter, SYN attack counter, and data attack counter can be implemented as one counter in a different embodiment, where any one of the RST, SYN, and data attacks is tracked by the same counter.

In response to predetermined events, such as periodically or each time a counter gets incremented, the attack detector checks (at 234) counter values against predefined thresholds. If any counter value exceeds a corresponding threshold, then the attack detector indicates (at 236) an attack has occurred.

Instructions of the various software modules discussed herein are loaded for execution on corresponding control units or processors, such as a CPU 116 or 128 (FIG. 1). Processors include microprocessors, microcontrollers, processor modules or subsystems (including one or more microprocessors or microcontrollers), or other control or computing devices. As used here, a "controller" refers to hardware, software, or a combination thereof. A "controller" can refer to a single component or to plural components (whether software or hardware).

Data and instructions (of the various software modules) are stored in one or more machine-readable storage media, such as storage 118, 130 (FIG. 1). The storage media include different forms of memory including semiconductor memory devices such as dynamic or static random access memories (DRAMs or SRAMs), non-volatile RAM (NV-RAM), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of detecting an attack of a network connection, comprising:
   receiving, by a network device over a network, a first message containing a sequence number that is within a valid sequence number range, the first message intended to cause reset of the network connection;
   dropping the first message even though the sequence number is within the valid sequence number range;
   in response to detecting that the sequence number in the first message is within the valid sequence number range, incrementing a first counter to track a number of occurrences of receiving the first message;
   receiving a data message containing a sequence number within the valid sequence number range and an acknowledge number outside a predefined acknowledge number range;
   dropping the data message in response to receiving the data message containing the sequence number within the valid sequence number range and the acknowledge number outside the predefined acknowledge number range; and
   incrementing a second counter in response to receiving the data message containing the sequence number within the valid sequence number range and the acknowledge number outside the predefined acknowledge number range.

2. The method of claim 1, further comprising:
   determining whether the sequence number in the first message matches exactly an expected sequence number,
   wherein dropping the first message and incrementing the first counter is further in response to determining that the sequence number in the first message does not match the expected sequence number exactly.

3. The method of claim 2, further comprising:
   receiving a second message containing a sequence number that does not match the expected sequence number but is within the valid sequence number range, the second message intended to reset the network connection;
   dropping the second message; and
   in response to detecting that the sequence number in the second message does not match the expected sequence number but is within the valid sequence number range, incrementing the first counter again.

4. The method of claim 1, wherein dropping the first message is performed instead of resetting the network connection in response to the first message.

5. The method of claim 4, wherein receiving the first message comprises receiving one of a Transmission Control Protocol (TCP) reset message and a TCP synchronize message.

6. The method of claim 5, wherein incrementing the first counter comprises incrementing a first counter in response to detecting the first message is a TCP reset message.

7. The method of claim 6, further comprising incrementing a third counter in response to detecting the first message is a TCP synchronize message.

8. The method of claim 1, wherein the first message comprises a Transmission Control Protocol (TCP) reset message, the method further comprising:
   determining whether the sequence number in the TCP reset message matches exactly an expected sequence number,
   wherein dropping the TCP reset message and incrementing the first counter is further in response to determining that the sequence number in the TCP reset message does not match the expected sequence number exactly;
   receiving a second TCP reset message containing a sequence number that matches the expected sequence number; and
   in response to the second TCP reset message, resetting the network connection, the network connection comprising a TCP connection.

9. The method of claim 1, further comprising:
   comparing a value of the first counter and a value of the second counter against respective thresholds; and
   indicating an attack of the network connection is occurring in response to detecting the value of the first counter and the value of the second counter exceeding the respective thresholds.

10. The method of claim 5, wherein receiving the data message comprises receiving a Transmission Control Protocol (TCP) data segment.

11. The method of claim 10, wherein receiving the TCP data segment comprises receiving the TCP data segment containing the acknowledge number outside the predefined acknowledge number range but within a valid acknowledge number range according to TCP.

12. An article comprising at least one non-transitory machine-readable storage medium containing instructions that when executed cause a system to:
   receive a synchronize message containing a sequence number within a valid sequence number range;
   send an acknowledgment message in response to the synchronize message;
   instead of resetting a network connection in response to the synchronize message, drop the synchronize message;
   increment a first counter to track a number of occurrences of the synchronize message;

determine, based on a count value of the first counter, whether an attack of the network connection is occurring;

receive a data message containing a sequence number within the valid sequence number range and an acknowledge number outside a predefined acknowledge number range but within a valid acknowledge number range;

drop the data message in response to determining that the sequence number in the data message is within the valid sequence number range and the acknowledge number is outside the predefined acknowledge number range; and increment a second counter in response to receiving the data message containing the sequence number within the valid sequence number range and the acknowledge number outside the predefined acknowledge number range.

13. The article of claim 12, wherein receiving the synchronize message comprises receiving a Transmission Control Protocol (TCP) synchronize segment.

14. The article of claim 12, wherein the instructions when executed cause the system to further:

receive a reset message containing a sequence number that does not match an expected sequence number but is within the valid sequence number range;

instead of resetting the network connection in response to the reset message, dropping the reset message; and incrementing a third counter to track a number of occurrences of the reset message in response to detecting that the sequence number in the reset message does not match the expected sequence number but is within the valid sequence number range.

15. The article of claim 12, wherein the valid acknowledge number range is according to a Transmission Control Protocol (TCP).

16. A system capable of establishing a network connection with another network device, comprising:

a processor;

first and second counters; and an attack detector executable in the processor to:

detect a first message containing a sequence number that does not match an expected sequence number but is within a valid sequence number range, the first message intended to cause reset of the network connection;

drop the first message even though the sequence number is within the valid sequence number range; and in response to detecting that the sequence number in the first message does not match an expected sequence number but is within the valid sequence number range, increment the first counter to track a number of occurrences of receiving the first message;

receive a data message containing a sequence number within the valid sequence number range and an acknowledge number outside a predefined acknowledge number range but within a valid acknowledge number range;

drop the data message in response to determining that the sequence number in the data message is within the valid sequence number range and the acknowledge number is outside the predefined acknowledge number range; and increment a second counter in response to receiving the data message containing the sequence number within the valid sequence number range and the acknowledge number outside the predefined acknowledge number range.

17. The system of claim 16, wherein the first message comprises a Transmission Control Protocol (TCP) reset message.

18. The system of claim 16, wherein the attack detector is executable to detect a second message containing a sequence number that matches the expected sequence number, the second message intended to cause reset of the network connection, the system further comprising:

a controller adapted to, in response to detecting that the second message contains a sequence number that matches the expected sequence number, cause reset of the network connection.

19. The system of claim 16, wherein the first message comprises at least one of a Transmission Control Protocol (TCP) reset message and a TCP synchronize message.

20. The system of claim 19, wherein the data message is a TCP data segment.

* * * * *